(12) United States Patent
Nagata

(10) Patent No.: US 10,414,334 B2
(45) Date of Patent: Sep. 17, 2019

(54) AUTOMATIC HAZARD LIGHT SYSTEMS AND METHODS

(71) Applicant: Toyota Motor Engineering & Manufacturing North America, Inc., Plano, TX (US)

(72) Inventor: Katsumi Nagata, Foster City, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 15/836,026

(22) Filed: Dec. 8, 2017

(65) Prior Publication Data

US 2019/0176687 A1 Jun. 13, 2019

(51) Int. Cl.
*B60Q 1/46* (2006.01)
*B60Q 1/52* (2006.01)
*B60W 40/13* (2012.01)
*B60W 40/105* (2012.01)

(52) U.S. Cl.
CPC ............ *B60Q 1/46* (2013.01); *B60Q 1/52* (2013.01); *B60W 40/105* (2013.01); *B60W 40/13* (2013.01); *B60W 2520/10* (2013.01)

(58) Field of Classification Search
CPC .......... B60Q 1/46; B60Q 1/52; B60Q 1/305; B60W 2520/10; B60W 40/13; B60W 40/105
USPC ......................................... 340/431, 466, 471
See application file for complete search history.

(56) References Cited

U.S. PATENT DOCUMENTS

| 4,843,370 A | 6/1989 | Milde, Jr. |
| 5,775,712 A | 7/1998 | Link |
| 6,023,221 A | 2/2000 | Michelotti |
| 7,397,349 B2 | 7/2008 | Lahr |
| 2006/0187008 A1* | 8/2006 | Yu .......................... B60D 1/58 340/431 |

OTHER PUBLICATIONS

BeamNG; Automatic Hazard Lights on Accident + Emergency Brakes, https://www.beamng.com/threads/automatic-hazard-lights-on-accident-emergency-brakes.3692/; Sep. 2, 2013.
VWVORTEX; Volkswagen Automatic Hazard Lights Under Emergency Braking (http://forums.vwvortex.com/showthread.php?3524694-Automatic-hazard-lights-under-emergency-braking); Sep. 14, 2017.

* cited by examiner

*Primary Examiner* — Ryan W Sherwin
(74) *Attorney, Agent, or Firm* — Sheppard Mullin Richter & Hampton, LLP; Hector A. Agdeppa; Daniel N. Yannuzzi

(57) ABSTRACT

Systems and methods of automatically operating a vehicle's hazards lights are provided. The speed of vehicle can be determined. When the speed of the vehicle is compared to an expected speed of the vehicle given various operating conditions, e.g., the output of the vehicle's engine (engine RPM) or motor (motor rotation), is slower than expected, it is assumed that the vehicle is towing a load. When the vehicle is towing a load and is also traveling at a speed that is substantially slower than the flow of traffic, a current speed limit, etc., a determination can be made to automatically activate the vehicle's hazard lights. Alternatively, even if the vehicle is towing a load, but is traveling at a speed that does not warrant activation of the vehicle's hazard lights, the hazard lights may be automatically deactivated.

15 Claims, 8 Drawing Sheets

AUTOMATIC HAZARD LIGHT SYSTEMS AND METHODS

TECHNICAL FIELD

The disclosed technology relates generally to automotive systems, and more particularly, some embodiments relate to automated hazard light activation or deactivation in response to various conditions.

DESCRIPTION OF THE RELATED ART

Motor vehicle lighting systems often include headlights, taillights, site-marker lights, running lights and turn signals. Motor vehicle lighting systems are intended not only to enable a driver to see better in dark conditions, but to alert other drivers as to the presence of the vehicle, its direction of travel, and possible changes in speed and direction of the vehicle.

In many vehicles, turn signals may also be used in an emergency/hazard mode. In emergency/hazard mode, the turn signals may be referred to as "hazards," "hazard warning flashers," "hazard warning lights," "emergency lights," "hazard lights," or simply "flashers." Domestic and international regulations require vehicles to be equipped with a control which, when activated, flashes the left and right directional signals, front and rear, all at the same time and in phase. Operation of the hazard lights must be from a control independent of the turn signal control and vehicle ignition. Moreover, an audiovisual tell-tale must be provided to the driver of the vehicle. This function is meant to indicate a hazard such as a vehicle stopped in or near moving traffic, a disabled vehicle, a vehicle moving substantially slower than the flow of traffic such as a truck climbing a steep grade, or the presence of stopped or slow traffic ahead on a high speed road.

Unfortunately, drivers often fail to use a vehicle's hazard lights. This is especially true when a vehicle is moving substantially slower than the flow of traffic due to the vehicle towing a load, e.g., a trailer. This can present a safety hazard. For example, following vehicles may suddenly come upon a tow vehicle unaware the tow vehicle is traveling slowly. If the following vehicle is traveling at a substantially higher speed, it may collide with the tow vehicle/towed load.

BRIEF SUMMARY OF EMBODIMENTS

In accordance with one embodiment, a computer-implemented method comprises determining whether a vehicle is towing a load and determining whether the vehicle is traveling above a speed threshold, upon a determination that the vehicle is towing the load. Upon a determination that hazard lights of the vehicle are activated, and a determination that the vehicle is not traveling above the speed threshold, activation of the hazard lights is maintained. Upon a determination that the hazard lights of the vehicle are not activated, and a determination that the vehicle is not traveling above the speed threshold, the hazard lights can be activated. Upon a determination that the hazard lights of the vehicle are not activated, and a determination that the vehicle is traveling above the speed threshold, the hazard lights are maintained in a deactivated state. Upon a determination that the hazard lights of the vehicle are activated, and a determination that the vehicle is traveling above the speed threshold, the hazard lights may be deactivated.

In some embodiments, the speed threshold comprises an absolute speed value. In some embodiments, the speed threshold comprises a relative speed differential between a speed at which the vehicle is traveling and speed of neighboring traffic or a current speed limit of a roadway on which the vehicle is traveling.

In some embodiments, determining whether the vehicle is towing a load comprises determining whether a speed at which the vehicle is traveling is lower than an expected speed of the vehicle given the vehicle's engine or motor output. Data regarding one or more roadway conditions can be used as a basis for adjusting the expected speed of the vehicle. In some embodiments, the data regarding the one or more roadway conditions are received in real- or near real-time, and the adjusting of the expected speed of the vehicle is adjusted in real- or near-real time. In some embodiments, the data regarding the one or more roadway conditions are received via at least one of vehicle-to-vehicle and vehicle-to-infrastructure communications.

In accordance with one embodiment, a system, comprises one or more sensors configured to determine one or more operating characteristics of the vehicle. The one or more operating characteristics of the vehicle include at least a speed of the vehicle and an engine or motor output of the vehicle. The system may further comprise a decision circuit communicatively connected to the one or more sensors via a data interface. The decision circuit may be configured to determine an expected speed of the vehicle, the expected speed of the vehicle being correlated to the engine or motor output. The decision circuit may be configured to compare the speed of the vehicle to the expected speed of the vehicle to determine whether a load is being towed or carried by the vehicle. Upon determining that a load is being towed or carried by the vehicle, a determination is made to see if the speed of the vehicle falls below a threshold warranting activation or maintaining activation of the vehicle's turn signals in hazard mode.

In some embodiments, the system further comprises a manually-activated hazard light switch. The decision circuit may transmit a control signal overriding the manually-activated hazard light switch upon a determination that activation of the vehicle's turn signals in hazard mode is warranted. In some embodiments, the decision circuit accesses a table in which the expected speed of the vehicle is correlated to the engine or motor output at a local or remote data store.

In some embodiments, the table is updated in real- or near real-time to reflect the expected speed of the vehicle contingent upon current roadway conditions.

In some embodiments, the threshold comprises a determined percentage of a current roadway speed limit or a current speed at which traffic is flowing In accordance with one embodiment, a computer-implemented method, comprises determining a speed at which a vehicle is traveling. The method may further comprise determining at least one of engine output of the vehicle, motor output of the vehicle, a current roadway speed limit, and a speed of neighboring vehicles. The speed at which the vehicle is traveling can be compared to an expected speed of the vehicle based on the at least one of the engine output of the vehicle, motor output of the vehicle, the current roadway speed limit, and the speed of neighboring vehicles. Accordingly, hazard lights of the vehicle are automatically operated based on the speed of the vehicle relative to the expected speed of the vehicle and the at least one of the current roadway speed limit and the speed of neighboring vehicles.

In some embodiments, automatically operating the hazard lights comprises activating the hazard lights upon a determination that the speed of the vehicle relative to the expected speed of the vehicle indicates that the vehicle is towing a load.

In some embodiments, automatically operating the hazard lights further comprises activating the hazard lights upon a further determination. That determination may be that the speed of the vehicle relative to the at least one of the current roadway speed and the speed of the neighboring vehicles falls below a threshold warranting the activating of the hazard lights.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed towards systems and methods for automatically activating or deactivating a vehicle's hazard lights. The automatic operation of a vehicle's hazard lights can be dependent on whether or not the vehicle is towing a load and whether or not the vehicle (while it is towing a load) is traveling at a lower-than-expected speed. The speed of the vehicle while towing a load can be determined and compared to an expected speed of travel. The expected speed of travel can based on a current speed limit, engine revolutions per minute (RPM)/torque output/motor rotation, and/or a current speed of traffic.

Vehicle speed can be determined by one or more sensors or calculated based on the vehicle's operating conditions. Vehicle speed can also be determined through location-based (e.g., GPS) calculations or communicating with other vehicles or roadway infrastructure through V2X communications. The one or more sensors can also be used to determine the operating conditions of the vehicle, e.g., engine RPM/torque output/motor rotation. Current speed limit and current speed of traffic can be determined by the one or more sensors, such as cameras, or by way of other vehicles or roadway infrastructure and communicated to the vehicle.

The comparison of the vehicle's speed to that of an expected speed of travel can be performed by an electronic control unit or a dedicated processor/system. The comparison can reveal whether or not the vehicle is towing a load. For example, high engine RPMs coupled with low vehicle speed suggests a towing condition. It should be noted that in some embodiments, sensors such as a camera, pressure sensor, and the like may be used to determine whether or not a vehicle is attached to a trailer or other tow load. If the vehicle is towing a load and is traveling slower than some determined speed threshold, its hazard lights may be automatically activated. If the vehicle is traveling above the determined speed threshold (even if it is determined to be towing a load), its hazard lights, if already activated, can be automatically deactivated. In this way, towing vehicles and following or nearby vehicles can be protected from potentially un-safe driving conditions. For example, a vehicle's hazard lights can be activated even when the driver inadvertently forgets to activate the vehicle's hazard lights. In scenarios where the hazard lights no longer need to or no longer should be on (some jurisdictions limit the use of hazard lights unless traveling below a certain speed), the hazard lights can automatically be deactivated.

Figure 1A:
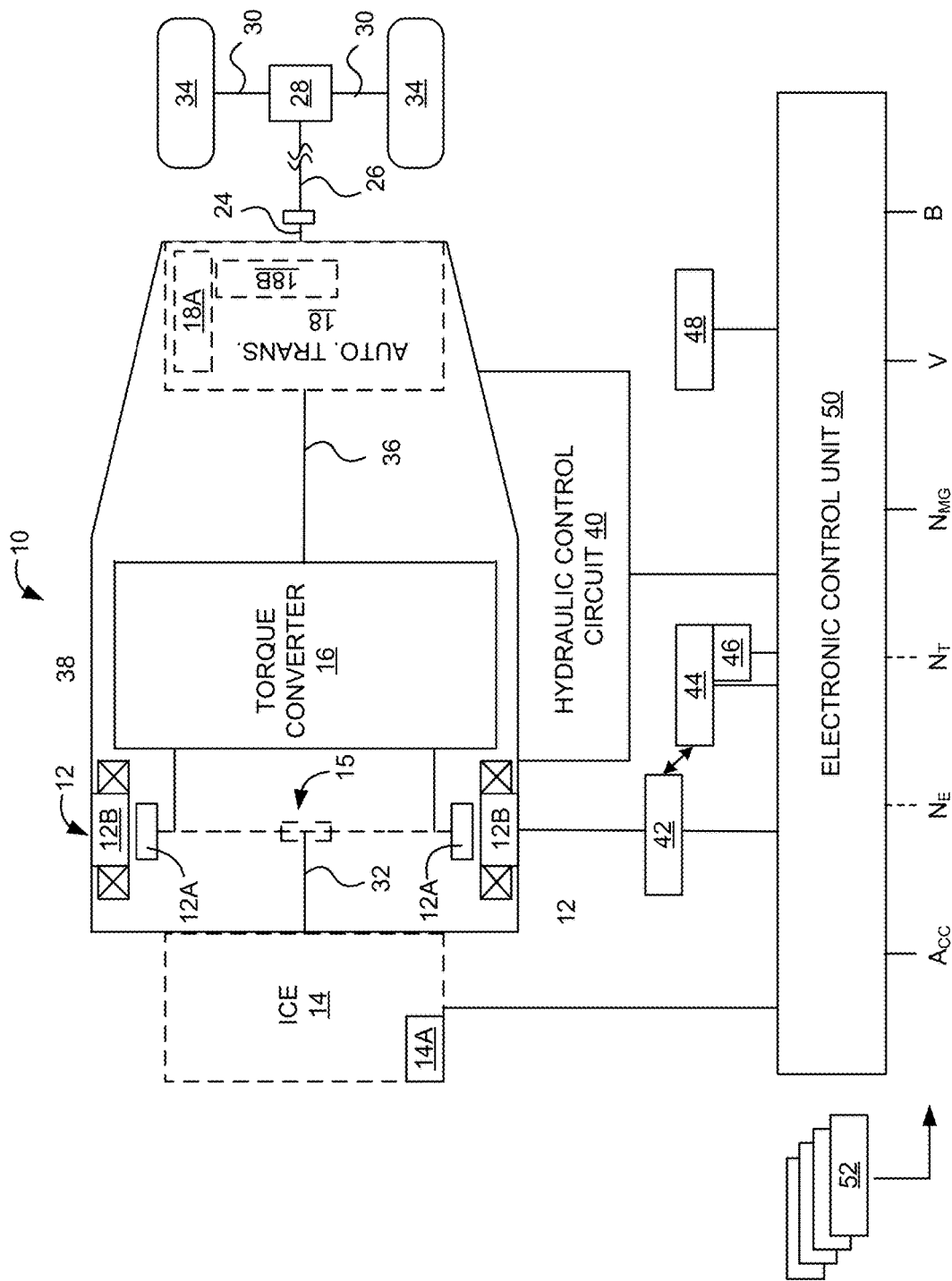
FIG. 1A illustrates an example of a vehicle with which systems and methods for automatically operating hazard lights can be implemented in accordance with one embodiment of the present disclosure.

An example vehicle in which automatic hazard light operation may be implemented is illustrated in FIG. 1A. Although the example described herein is a hybrid type of vehicle as shown in FIG. 1A, the systems and methods for automatic hazard light operation can be implemented in other types of vehicles including engine-only vehicles, e.g., gasoline- or diesel-powered vehicles, fuel-cell vehicles, electric vehicles, or other suitably powered vehicles.

FIG. 1A illustrates a drive system of a hybrid electric vehicle 10 that may include an internal combustion engine 14 and one or more electric motors 12 as sources of motive power. Driving force generated by the internal combustion engine 14 and motor 12 can be transmitted to one or more wheels 34 via a torque converter 16, a transmission 18, a differential gear device 28, and a pair of axles 30.

As a hybrid electric vehicle, vehicle 10 may be driven/powered with either or both of engine 14 and the motor(s) 12 as the drive source for travel. For example, a first travel mode may be an engine-only travel mode that only uses the internal combustion engine 14 as the drive source for travel. A second travel mode may be an EV travel mode that only uses the motor(s) 12 as the drive source for travel. A third travel mode may be an HEV (hybrid electric vehicle) hybrid travel mode that uses engine 14 and the motor(s) 12 as drive sources for travel. In the engine-only and HEV travel modes, hybrid vehicle 10 relies on the motive force generated at least by internal combustion engine 14, and a clutch 15 may be included to engage engine 14. In the EV travel mode, hybrid vehicle 10 is powered by the motive force generated by motor 12 while engine 14 may be stopped and clutch 15 disengaged.

Engine 14 can be an internal combustion engine such as a gasoline, diesel or similarly powered engine in which fuel is injected into and combusted in a combustion chamber. An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 12 can also be used to provide motive power in vehicle 10, and is powered electrically via a power storage device 44. Motor 12 can be powered by power storage device 44 to generate a motive force to move the vehicle and adjust vehicle speed. Motor 12 can also function as a generator to generate electrical power such as, for example, when coasting or braking. Power storage device 44 may also be used to power other electrical or electronic systems in the vehicle. Motor 12 may be connected to power storage device 44 via an inverter 42. Power storage device 44 can include, for example, one or more batteries, capacitive storage units, or other storage reservoirs suitable for storing electrical energy that can be used to power one or more motors 12. When power storage device 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motors and adjust the current received from motors 12 during regenerative coasting and breaking. As a more particular example, output torque of the motor 12 can be increased or decreased by electronic control unit 50 through the inverter 42.

A torque converter 16 can be included to control the application of power from engine 14 and motors 12 to transmission 18. Torque converter 16 can include a viscous coupling the transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motors 12 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement or complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 10 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1A, electronic control unit 50 receives information from a plurality of sensors included in vehicle 10. For example, electronic control unit 50 may receive signals that indicate an vehicle operating conditions or characteristics. These may include, but are not limited to accelerator operation amount, $A_{CC}$, a revolution speed, $N_E$, of engine 14 (engine RPM), a rotational speed, $N_{MG}$, of the motor 12 (motor rotational speed), and vehicle speed, V. These may also include torque converter 16 output $N_T$ (e.g., output amps indicative of motor output), brake operation amount, B, battery state of charge (SOC) (i.e., the charged amount for battery 44 detected by an SOC sensor 46). Accordingly, vehicle 10 can include a plurality of sensors 52 they can be used to detect various conditions internal or external to the vehicle and provide sensed conditions to engine control unit 50 (which, again, may be implemented as one or a plurality of individual control circuits). In one embodiment, sensors 52 may be included to detect one or more conditions such as, for example, vehicle speed and changes in speed, vehicle attitude (i.e., roll pitch and yaw), vehicle braking, wheel rotation, and so on.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In yet further embodiments, hybrid sensors may be included that provide a combination of raw data and processed data to electronic control unit 50. Sensor 52 may provide an analog output or a digital output.

Sensors 52 may be included to detect not only vehicle conditions but also to detect external conditions as well. Sensors that might be used to detect external conditions can include, for example, environmental sensors such as pressure or presence sensors for detecting the presence of a towed load. Another example of sensors that detect external conditions can include sonar, radar, lidar or other vehicle proximity sensors and cameras or other image sensors. Image sensors can be used to detect, for example, traffic signs indicating a current speed limit, road curvature, obstacles, and so on. While some sensors can be used to actively detect passive environmental objects, other sensors can be included and used to detect active objects such as those objects used to implement smart roadways that may actively transmit data or other information.

Figure 1B:
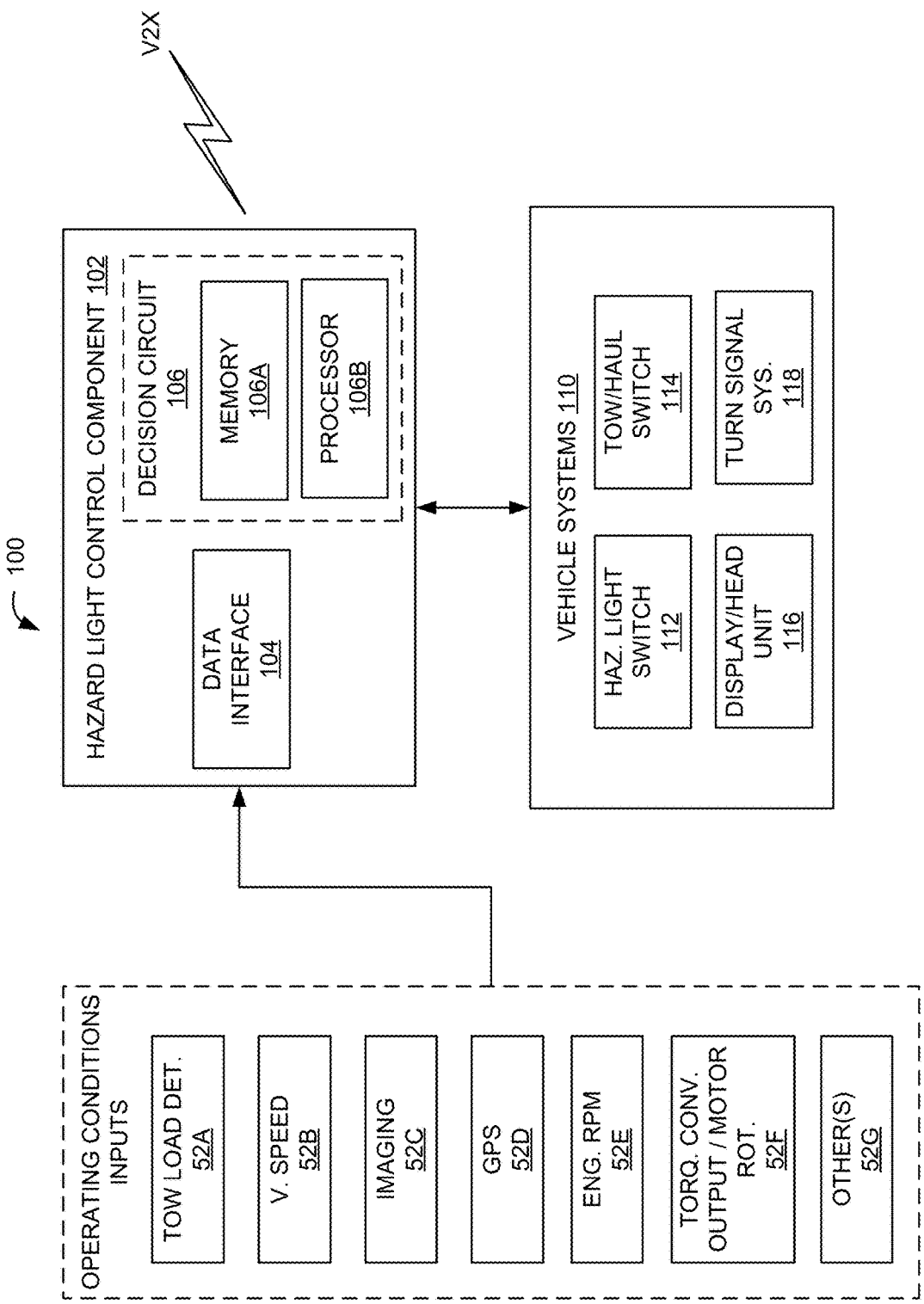
FIG. 1B illustrates an example architecture for implementing automatic operation of hazard lights in the vehicle of FIG. 1A.

FIG. 1B is a diagram illustrating an example of a towed load detection and automatic hazard light operation system in accordance with one embodiment of the present disclosure. In this example, system 100 includes a hazard light control component 102, a plurality of sensors 52A-G, and a plurality of vehicle systems 110. Sensors 52A-G and vehicle systems 110 can communicate with hazard light control component 102 via a wired or wireless communication interface. Although sensors 52A-G and vehicle systems 110 are depicted as communicating with hazard light control component 102, they can also communicate with each other as well as with other vehicle systems. hazard light control component 102 can be implemented as a standalone electronic control unit or as part of an electronic control unit such as, for example electronic control unit 50.

Hazard light control component 102 in this example includes a data interface 104, and a decision circuit 106 (including a memory 106A and processor 106B in this example). Components of hazard light control component 102 may communicate with each other via a data bus, although other communication in interfaces can be included.

Processor 106B may be a GPU, CPU, microprocessor, or any other suitable processing system. The memory 106A may include one or more various forms of memory or data storage (e.g., flash, RAM, etc.) that may be used to store the calibration parameters, images (analysis or historic), point parameters, instructions and variables for processor 106B as well as any other suitable information. Memory 106A, can be made up of one or more modules of one or more different types of memory, and may be configured to store data and other information as well as operational instructions that may be used by the processor 106B to control hazard light control component 102.

Although the example of FIG. 1B is illustrated using processor and memory circuitry, as described below with reference to circuits disclosed herein, decision circuit 106 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a hazard light control component 102.

Data interface 104 can be either a wireless communications/processing interface or a wired communications/processing interface with an associated hardwired data port (not illustrated). As this example illustrates, communications with hazard light control component 102 can include either or both wired and wireless communications. A wireless data interface can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise.

A wired data interface can include a transmitter and a receiver (not shown) for hardwired communications with other devices, e.g., a hardwired interface to other components, including sensors 52A-G and vehicle systems 110. A wired data interface can communicate with other devices using Ethernet or any of a number of other wired communication protocols whether standardized, proprietary, open, point-to-point, networked or otherwise.

Data interface 104 can be used to transmit and receive data between hazard light control component 102 and sensors 52A-G, as well as between hazard light control component 102 and vehicle systems 110. For example, data interface 104 can be configured to receive data and other information from, e.g., tow load detection sensor 52A (which may be a pressure sensor capable of sensing the presence of a trailer connected to a hitch). This sensor data can be used to determine whether or not vehicle 10 is connected to a tow load. Additionally, data interface 104 can be configured to receive data and other information from, e.g., vehicle speed sensor 52B). This sensor data can be used to determine the speed of vehicle 10, which in conjunction with a determination that vehicle 10 is towing a load, can be used to automatically activate vehicle 10's hazard lights if warranted. Additionally, data interface 104 can be used to send an activation signal or other activation information based upon an activation decision from decision circuit 106 to turn signal system 118 to activate a hazard mode of operation.

Sensors 52A-G may be example embodiments of sensors 52 illustrated in FIG. 1A. Sensors 52A-G can include one or more of the above-mentioned sensors and/or sensors capable of sensing the above-mentioned data that may be operating conditions inputs. The operating conditions inputs may be used in deciding whether or not to automatically activate/deactivate the hazard mode of turn signal system 118. It should be understood that not all the illustrated sensors are necessarily needed, and that additional sensors (other sensor(s) 52G) may be used.

In some embodiments, sensors may be used to determine the presence of a tow load being towed or connected to vehicle 10. For example, tow load determination sensor 52A may be a pressure sensor configured to sense the pressure of a trailer hitch on or otherwise connected to a hitch mount of vehicle 10. In some embodiments, tow load determination sensor 52A may be an electronic sensor or unit configured to determine whether a tow load, such as a trailer, is electronically connected to one or more elements of vehicle systems 110, such as turn signal system 118 (or other lighting, e.g., brake lighting system), brake system (not illustrated), etc. In some embodiments, the tow load determination sensor 52A may determine a wireless, electronic connection or a wired, electronic connection. For example, some trailers may be equipped with wireless communication elements, e.g., transceivers, configured to wirelessly connect to one or more vehicle systems 110. Some trailers may be equipped with wire/cable connectors made to physically plug into one or more vehicle systems 110. In some embodiments tow load determination sensor 52A may be a physical or optical switch/toggle on a vehicle's hitch mount configured to switch/toggle between an unconnected to connected state upon connection of a trailer to the vehicle's hitch mount.

In some embodiments, an imaging sensor 52C, such as a camera may be used to visually determine whether or not a towed load, e.g., trailer, is connected to vehicle 10. For example, a camera may be located at or near vehicle 10's hitch mount, and configured to capture live/still images or video of vehicle 10's hitch mount and forward those captured live/still images or video to a display or head unit 116. In this way, a driver or operator of vehicle 10 may visually confirm whether or not a tow load is connected to vehicle 10. In some embodiments imaging sensor 52C may be an infrared or other form of light sensor configured to detect an infrared or corresponding light from an emitter located on, e.g., a trailer hitch. When the trailer hitch is connected to vehicle 10's hitch mount, imaging sensor 52C can detect light being emitted from the emitter, thereby indicating that a trailer or other load is connected to vehicle 10. A signal or other notification may be sent to, e.g., display or head unit 116, notifying the driver or operator of this towing condition. In some embodiments, the aforementioned sensors or similar sensors may be used to detect the presence of connection of safety chains to vehicle 10. That is, instead of sensing a trailer hitch on a hitch mount, the presence of safety chains may be used as an indication that a tow load is present. In still other embodiments, another sensor(s) 52G may be used to detect whether or not vehicle 10 (which may use an air suspension system) is supporting a load by the amount of air being used.

In some embodiments, other sensors may be used to provide data that can be used in a calculation or comparison operation to determine whether or not vehicle 10 is towing or connected to a tow load. For example, a vehicle speed sensor 52B may be configured to determine the speed at which vehicle 10 is traveling. In some embodiments, vehicle speed sensor 52B may be sensor configured to determine the number of revolutions one or more wheels (e.g., wheels 34) are turning over some period of time. This number of revolutions may be translated into vehicle speed through one or more known calculations that may be performed on vehicle speed sensor 52B or that may be performed by processor 106B. In some embodiments, vehicle speed sensor 52B may be a radar, sonar, or other device that uses, e.g., the Doppler effect, to determine the speed at which vehicle 10 is traveling. For example, a radar may be used to transmit a beam to a roadside fixed object, such as a traffic sign, and the speed of vehicle 10 can be determined based upon the change in frequency of the beam upon bouncing back from the roadside object. In this example, vehicle speed sensor 52B may operate in conjunction with another sensor(s), such as an imaging sensor 52C, that can be used to detect potential roadside objects at which to direct a beam.

In some embodiments, a GPS sensor (receiver) 52D may be used to determine the location of vehicle 10 at some point in time. Based on a subsequent location to which vehicle 10 has traveled and the time it took for vehicle 10 to traverse the distance to the subsequent location can be used to determine its speed. Again, GPS sensor/receiver 52D may have the capability to perform this speed calculation, or the locations data alone may be transmitted to processor 106B to be translated into vehicle speed data. In some embodiments GPS sensor 52D may communicate with one or more location-based systems, navigation information providers, and the like to receive location information that can ultimately be used to calculate the speed at which vehicle 10 is traveling. It should be understood that although other types of sensors/receivers operable in other types or forms of positioning/location systems, e.g., GLONASS, GALILEO, BEIDOU, etc.

In still other embodiments, vehicle 10 may communicate with roadside units of a vehicle-to-infrastructure (V2I) communications system or one or more other vehicles (V2V communications) (both referred to as V2X communications) to determine and/or receive information indicative of the speed at which it is traveling. These V2X communications may occur between one or more roadside units and/or one or more other vehicles. They can be received directly by hazard light control component 102 or another electronic control unit or other communications component of vehicle 10 (and forwarded to hazard light control component 102 vis data interface 104).

As alluded to above, in some embodiments, a comparison can be made between vehicle speed and engine/motor output, e.g., a vehicle's operating conditions or characteristics, such as engine RPM or torque converter output/motor rotation. Accordingly, in some embodiments, an engine RPM sensor 52E can be used to determine the number of rotations per minute that the engine 14 of vehicle 10 is experiencing. This may be the case if vehicle 10 is an engine-only vehicle or an HEV. In some embodiments, the output of torque converter 16 may be measured (e.g., through output amperage) and/or the rotational speed at which motor 12 is operating may be measured using commensurate sensor 52E. This may be the case if vehicle 10 is an HEV or an electric-only vehicle. Data indicative of either or both of these operating characteristics may suggest how hard vehicle 10 is operating. As also alluded to above, a determination that the speed at which vehicle 10 is traveling is slower than expected given the engine RPM/motor rotation/torque output, it can be assumed that vehicle 10 is towing or connected to some tow load.

Decision circuit 106 may receive or obtain one or more operating conditions input as data signals through data interface 104. As previously noted, these operating conditions inputs may be used to verify the presence (or absence of a tow load), as well as vehicle speed, and the operating characteristics of a vehicle, e.g., vehicle 10. The operating conditions input may be stored in memory 106A. Memory 106A may be used for "long-term" storage or, e.g., as a buffer or real-time cache used to store relevant operating conditions input that processor 106B uses to determine whether or not turn signal system 118 should be put into hazard mode.

In some embodiments decision circuit 106 may be a comparator comparing, e.g., vehicle speed to engine RPM or torque converter output/motor rotation. In some embodiments, decision circuit 106 may receive data reflecting vehicle speed and engine RPM. One or both may be translated or converted into a format in which their values can be readily compared. For example, memory 106A may further include a data store, such as a table, containing information correlating engine RPM to expected speed when vehicle 10 is traveling without a tow load. In this way, a baseline or expected vehicle speed associated with a given engine RPM can be determined.

In some embodiments, engine RPM may be the basis used to determine whether or not a tow load is present. That is, tests may be made regarding vehicle 10 (or its make, model, type, etc.) that determine how much engine RPM increases depending on the weight or amount of tow load. For example, different tow loads can be tested to develop a knowledge base correlating engine RPM to tow load weight and expected vehicle speed. If engine RPM increases without a corresponding increase in expected vehicle speed, the assumption can be made by decision circuit 106 that vehicle 10 is in a tow condition. In some instances, this can also impact threshold speeds or threshold speed differentials (described below) because a vehicle towing a small load may travel faster than when towing a large load.

It should be noted that vehicle profiles can be created, where the vehicle profiles contain such information regarding expected vehicle speed, engine RPM, tow load weight, etc.

Upon obtaining the expected vehicle speed from memory 106A (depending on the engine RPM data obtained from, e.g., engine RPM sensor 52E), the expected vehicle speed can be compared to the actual vehicle speed obtained from, e.g., vehicle speed sensor 52B. If the actual vehicle speed is less or sufficiently less (based on some threshold speed differential) than decision circuit 106 may determine that vehicle 10 is connected to a tow load. The expected vehicle speed and engine RPM data can be determined by the vehicle manufacturer and stored in memory 106A during manufacturing of vehicle 10. In some embodiments, expected vehicle speed and engine RPM data may be obtained from another source, such as an appropriate database accessible by vehicle 10. The threshold speed differential may be determined or set based upon vehicle make, model, type, etc. In some embodiments, vehicle-specific data may be used to determine the threshold speed differential. For example, some vehicles may have a greater allowable variance between expected vehicle speed based on engine RPM versus another vehicle.

Moreover, decision circuit 106 may compare the actual vehicle speed of vehicle 10 to a speed threshold associated with hazard light activation or deactivation. If the actual vehicle speed of vehicle 10 surpasses this speed threshold, vehicle 10's hazard lights may be activated or deactivated accordingly. In some embodiments, this speed threshold may be reflected as another differential. That is, decision circuit 106 may determine whether or not to activate/deactivate vehicle 10's hazard lights based upon relative speed. For example, decision circuit 106 may only determine activation of vehicle 10's hazard lights are warranted when vehicle 10's actual vehicle speed is some percentage below the speed of traffic or a current speed limit, rather than an absolute minimum speed threshold. In other embodiments, decision circuit 106 may base its decision on an absolute minimum speed threshold, e.g., if vehicle 10 is traveling below 25 miles per hour, decision circuit 106 will determine that vehicle 10's hazard lights should be activated.

It should be noted that in some embodiments, sensors 52 and/or V2X communications may be used to determine road conditions, such as road grade, weather, etc. as road conditions may impact the expected speed of vehicle 10 relative to engine RPM. For example, traveling up an incline may result in higher engine RPMs that when traveling flat roadway. In this case, road grade should be considered when comparing vehicle 10's actual vehicle speed and expected speed. In some embodiments the expected vehicle speed and engine RPM information may already be included in memory 106A. In other embodiments, this road conditions information may be received in real-time and used to update or "calibrate" the expected vehicle speed to engine RPM correlation. For example, upon receiving V2X communications at vehicle 10 regarding road conditions, decision circuit 106 may re-evaluate or adjust the correlation between expected vehicle speed and engine RPM. In determining whether or not to activate/deactivate vehicle 10's hazard lights, the re-evaluated or adjusted correlation may be used by decision circuit 106.

It should also be noted that the above functionality can be adapted accordingly when comparing vehicle speed to torque converter output and/or motor rotation data. For example, torque converter output and/or motor rotation data can be translated into expected vehicle speed, correlated with expected vehicle speed in a table or other data structure, etc. that is stored locally, e.g., in memory 106A, or at a remote data store.

In the example illustrated in FIG. 1B, vehicle systems 110 include hazard light switch 112, tow/haul switch 114, display/head unit 116, and turn signal system 118. In some vehicles, e.g., vehicle 10, a driver, operator, or passenger may be able to manually activate vehicle 10's hazard lights by actuating hazard light switch 112. Actuating hazard light switch 112 may result in a control signal being sent to hazard light control component 102 instructing hazard light control component 102 to activate vehicle 10's hazard lights. Accordingly, hazard light control component 102 may send another control signal or relay the received control signal to turn signal system 118. Turn signal system 118 may then activate its hazard mode such that the turn signals commence simultaneously blinking (or operating in whatever fashion is associated with its hazard mode). In some embodiments, vehicle 10 may indicate to the driver, operator, or other passenger that the hazard lights are on by one or more of correspondingly flashing the turn signal indicators, displaying an indication on a display/head unit 116, etc. It should be understood that there may be multiple displays in vehicle 10 and the presentation of hazard light activation may occur on different ones of these displays, e.g., a dashboard, a dashboard display, an instrument cluster, an instrument cluster display, a heads up display, etc. Moreover, it should be understood that a head unit can refer to a vehicle's "main" or "central" display, such as the display associated with the vehicle's entertainment system, navigation system, and the like.

In some vehicles, e.g., vehicle 10, a driver, operator, or other passenger may be able to manually indicate that a tow load is connected to or being towed by vehicle 10 using tow/haul switch 114. In some embodiments, upon detecting the presence of a tow load (described above), tow/haul switch 114 may be automatically activated. In some embodiments, tow/haul switch 114 may include or be co-located with an indicator, such as a light, LED, or other visual indicator that may turn on, blink, or otherwise signify the presence of a tow load. In some embodiments, instead of or in addition to such indicators, display/head unit 116 may present an indication that a tow load is being towed or connected to vehicle 10.

Because the above-described hazard light switch 112 and tow/haul switch 114 may be manual switches, automatic activation/deactivation of vehicle 10's hazard lights as well as automatic detection of a tow load can be used as a backup or redundancy measure. In some embodiments, they may be used as a corrective measure. For example, in the case of hazard light switch 112, a driver of vehicle 10 may forget to activate the hazard lights when needed or may forget to deactivate the hazard lights when needed. In some embodiments, actuation or activation of tow/haul switch 114 may be used to indicate a tow load presence to hazard light control component 102 as part of determining whether or not the hazard lights should be activated/deactivated.

Turn signal system 118 can include, for example, vehicle turning indications signals (sometimes colloquially referred to as blinkers), and control systems that control the activation/deactivation of the turn signals.

Figure 2A:
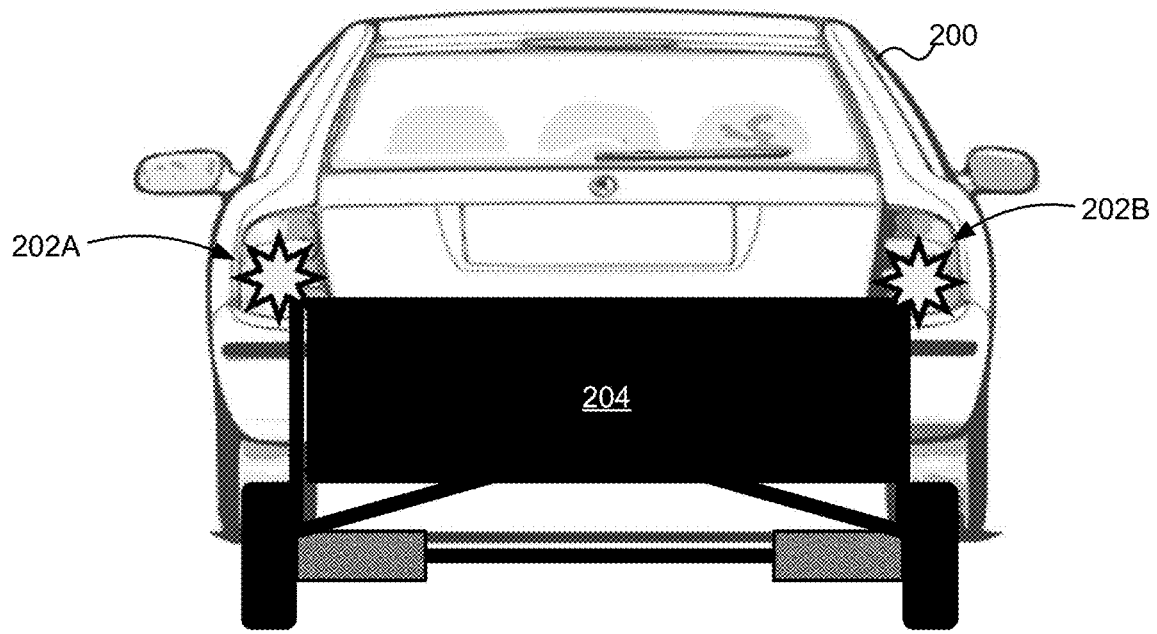
FIG. 2A illustrates an example tow vehicle and towed load in accordance with one embodiment of the present disclosure.

FIG. 2A illustrates an example vehicle 200, which may be one embodiment of vehicle 10 (FIG. 1A) to which a trailer 204 is connected. When trailer 204 is connected to vehicle 200 and vehicle 200 is traveling below some threshold speed (described above), turn signals 202A and 202B may be automatically activated to operate in hazard mode. In hazard mode, as previously discussed, turn signal 202A and 202B can simultaneously blink on/off. If vehicle 200 is traveling above the threshold speed, the hazard mode operation of turn signals 202A and 202B may be automatically deactivated.

Figure 2B:
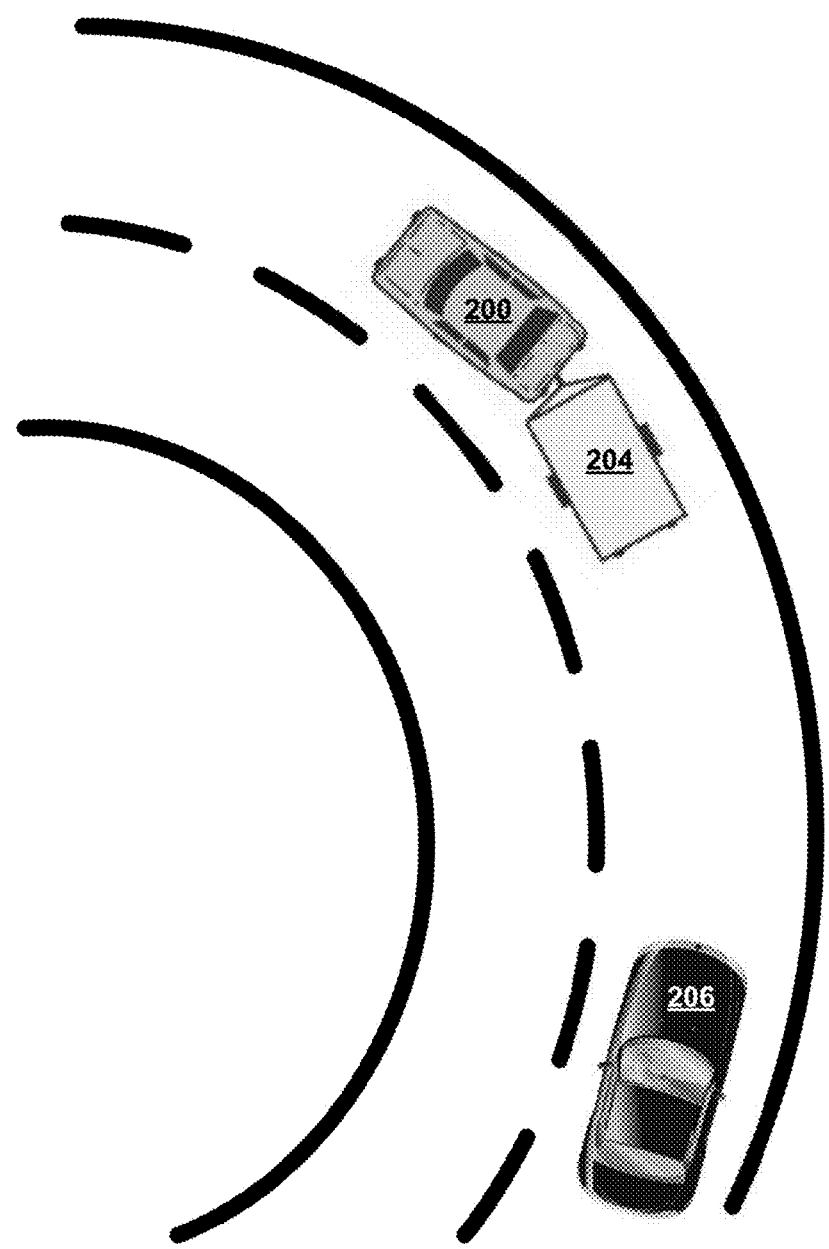
FIG. 2B illustrates an example scenario in which a following vehicle approaches the tow vehicle of FIG. 2A on a curved section of roadway.
Figure 2C:
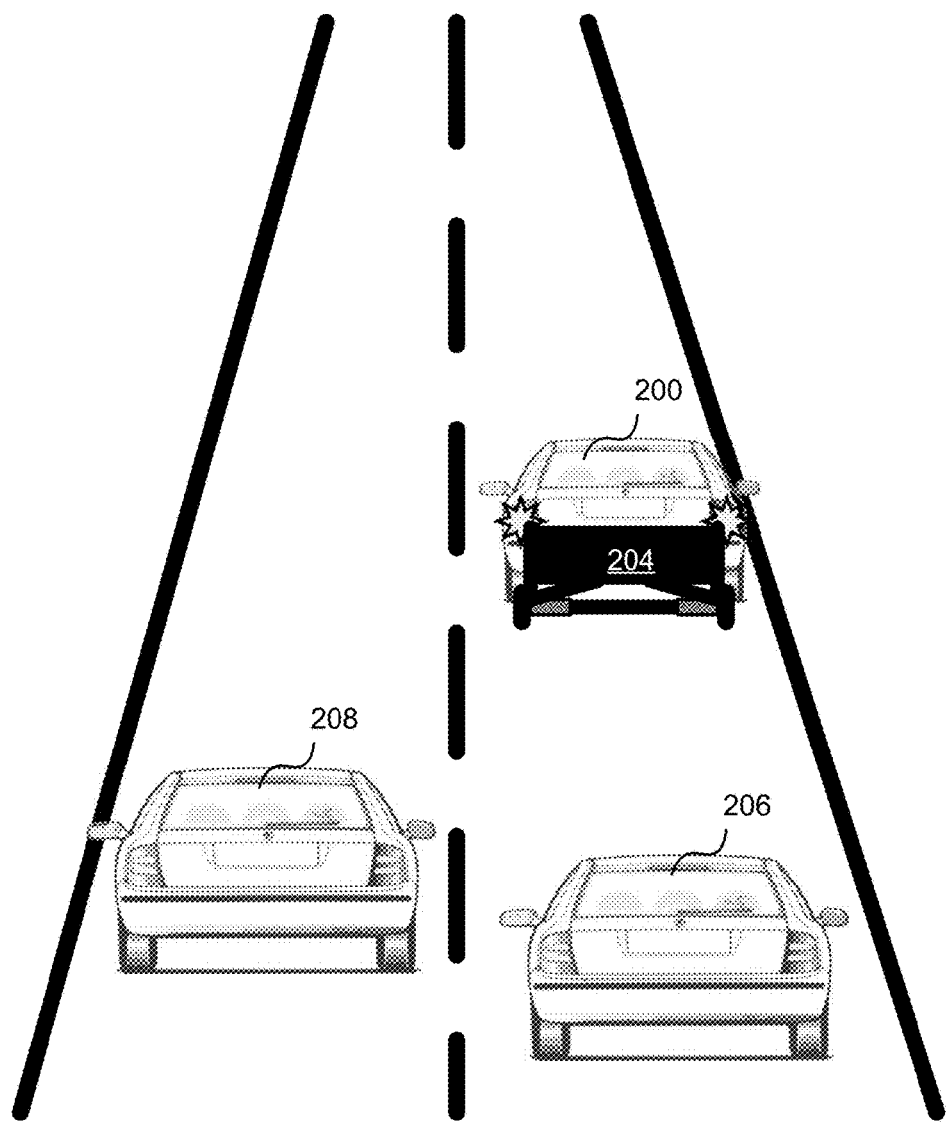
FIG. 2C illustrates an example scenario in which a following vehicle approaches the tow vehicle of FIG. 2A.

FIGS. 2B and 2C illustrate example scenarios during which automatic activation/deactivation of a vehicle's hazard lights might be beneficial to prevent possible accidents or unsafe driving conditions. The various embodiments effectuating automatic hazard light operation while towing a load may be described below with reference to these example scenarios. After reading this description, one of ordinary skill in the art will understand how systems and methods for automatic hazard light operation may be implemented in other vehicle environments and/or may be useful in other scenarios.

FIG. 2B illustrates a scenario in which vehicle 200 is towing trailer 204. Vehicle 200 may be traveling a portion of the roadway that is curved or includes a turn, wherein vehicle 200 is negotiating that turn. Using one or more of the above-described techniques, it can be determined or confirmed that vehicle 200 is towing trailer 204, in which case, vehicle 200's hazard lights may be automatically activated. Also illustrated in FIG. 2B is vehicle 206 that is following vehicle 200. If vehicle 206 was traveling at a substantially faster speed than vehicle 200 (due to vehicle 200 being operated at a safe towing speed), vehicle 206 may suddenly come upon vehicle 200. Unless vehicle 200's hazard lights were on to warn vehicle 206 of its presence and that it was traveling at a substantially reduced speed, vehicle 206 might crash into vehicle 200/trailer 204. The curved roadway further exacerbates the danger of this scenario as the curve or turn may already hide vehicle 200/trailer 204 from the view of vehicle 206.

Alternatively, if vehicle 200 was traveling at an expected speed (albeit faster than it should given its towing condition), having its hazard lights activated may shock vehicle 206 as it negotiates the turn as vehicle 200/trailer 204 come into view. Due to the shock of seeing hazard lights, the driver of vehicle 206 may engage in hard braking even though it is not necessary given that vehicle 200 is not traveling at a substantially reduced speed. This results in an unnecessary maneuver on the part of the driver of vehicle 206, thereby creating an unsafe condition. In this scenario, automatic deactivation of vehicle 200's hazard lights would be beneficial.

FIG. 2C illustrates another scenario in which vehicle 200 is traveling along a roadway while towing trailer 204. In this scenario, vehicle 200 may be traveling during the night or in a poorly-lit section of roadway. Similar to the scenario illustrated in FIG. 2B and described above, vehicle 206 may be following vehicle 200, and traveling at a speed that is substantially faster that the speed at which vehicle 200 is traveling. Unless vehicle 200's hazard lights are activated, given the dark or poorly-lit conditions, vehicle 206 may not realize vehicle 200 is towing trailer 204 and potentially rear-end vehicle 200/trailer 204, have to take evasive measures creating an unsafe situation, etc. It should be understood that in some cases, a trailer or other tow load may have its own lighting/lighting system that is synced to that of the tow vehicle, in which case, automatic operation of the two vehicle's hazard lights also applies to that of the trailer.

FIG. 2C also illustrates a vehicle 208. Vehicle 208, in one scenario, may be an autonomous vehicle or a vehicle being operated in autonomous or driver-assisted mode. Accordingly, vehicle 208 may be configured or programmed to sense hazardous or potentially unsafe conditions vis-à-vis detection of another vehicle's hazard lights. If vehicle 200 is traveling at a "normal" speed (despite towing trailer 204), and the operator of vehicle 200 has activated vehicle 200's hazard lights regardless, vehicle 208 may, upon detecting the hazard lights, slow down or brake unnecessarily. This situation can be avoided by the automatic deactivation of vehicle 200's hazard lights upon vehicle 200's speed passing a threshold speed or speed differential.

Figure 3:
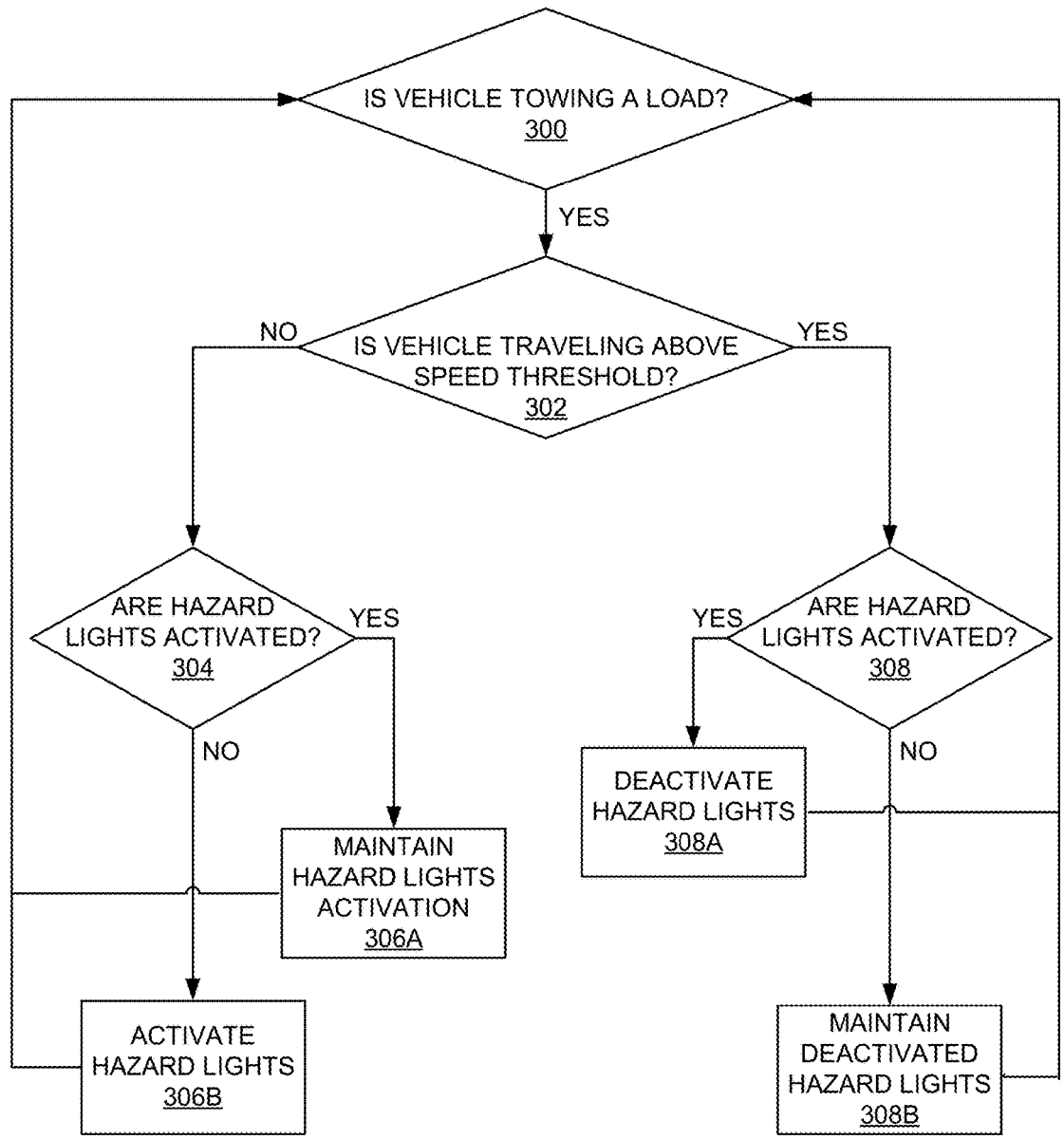
FIG. 3 is a flow chart illustrating example operations that can be performed to achieve automatic operation of hazard lights in accordance with one embodiment of the present disclosure.

FIG. 3 illustrates example operations that can be performed, e.g., by hazard light control component 102 (FIG. 1B), to determine whether or not to activate or deactivate a vehicle's hazard lights. At operation 300, a determination is made regarding whether or not a vehicle is towing a load. As previously discussed, various sensors can be used to obtain data indicating or confirming whether or not a load is being towed by a vehicle, e.g., hitch mount sensor, engine RPM, camera (such as a dedicated tow detection camera or back-up camera), etc.

If it is determined that the vehicle is towing a load, such as a trailer, another determination is made at operation 302 to check whether or not the vehicle is traveling above a speed threshold. As discussed above, the speed threshold may be an absolute speed threshold, e.g., a specified speed, 30 mph, 40 mph, 50 mph, etc. If the speed threshold is met or exceeded, the vehicle's hazard lights will not be activated or will be deactivated (described below). In some embodiments, the speed threshold may be a threshold speed differential, e.g., relative to an applicable speed limit and/or the current speed of traffic. For example, if the vehicle is towing a trailer and traveling at a speed of 32 mph, but the vehicle is in traffic and the rest of the nearby vehicles are also traveling at approximately 25-30 mph, the vehicle's hazard lights may remain deactivated. Alternatively, the vehicle must be traveling at some level, e.g., percentage, below the current speed limit or relative to the flow of traffic in order for the vehicle's hazard lights to be activated/remain activated. For example, if the vehicle is traveling 20% slower than the speed limit and/or neighboring traffic, its hazard lights may be activated/remain activated.

In some embodiments, hazard light control component 102 may switch the type of speed threshold it uses or considers depending on the road conditions. For example, and referring back to FIG. 1B, vehicle 10 may, via V2X communications, receive information indicating the presence of or approaching traffic jam conditions, or imaging sensor 52C may detect a large number of slow-moving vehicles near vehicle 10. In this case, hazard light control component 102 may rely on relative speed or a threshold speed differential to make its decision. If vehicle 10 is not in a crowded traffic condition, hazard light control component 102 may rely on an absolute speed threshold or threshold speed differential. Other conditions, situations may warrant using one type of speed threshold over another.

If the vehicle is not traveling above the speed threshold, at operation 304, a check is performed to determine whether or not the vehicle's hazard lights are activated. As previously discussed, many vehicles have a hazard light switch, e.g., hazard light switch 112 (FIG. 1B) with which an operator or passenger may manually activate a vehicle's hazard lights. If the hazard lights are already activated, and the conditions warrant hazard light activation, this state of operation may be maintained at operation 306A. If the hazard lights are not activated, at operation 306B, the hazard lights are activated. It should be noted that these series of operations may be repeated periodically or aperiodically to determine whether or not the current operating conditions of the vehicle warrant activation of the hazard lights.

If the vehicle is traveling above the speed threshold, a check is performed to determine whether or not the hazard lights are activated at operation 308. If the hazard lights are activated, e.g., an operator of the vehicle forgot to manually deactivate the hazard lights upon speeding up, the hazard lights are deactivated at operation 308A. If the hazard lights have already been deactivated (or if they were never activated), the hazard lights are maintained in their deactivated state at operation 308B.

In some embodiments, a notification, such as a pop-up notification or confirmation notification informing a vehicle operation or passenger regarding the current status/change in status of the hazard lights can be presented. Such a notification can be presented on one or more displays or head unit, e.g., display/head unit 116 (FIG. 1B). In this way, some level of manual, operator/passenger control can still be afforded. In some cases, a driver may wish to maintain activated hazard lights regardless of the speed he/she is operating the vehicle. Similar notifications may be provided regarding, e.g., confirming the presence of a tow load.

Figure 4:
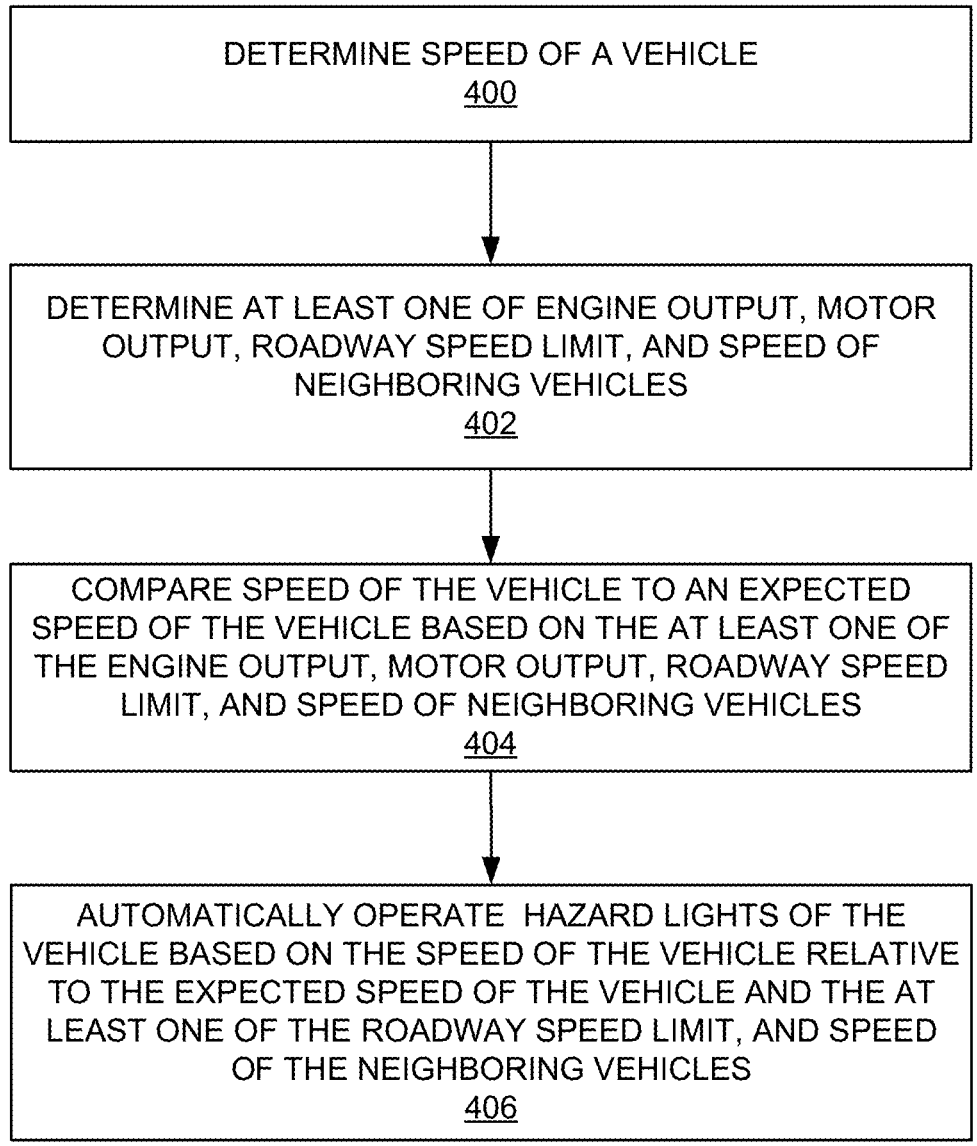
FIG. 4 is a flow chart illustrating example operations that can be performed to achieve automatic operation of hazard lights in accordance with one embodiment of the present disclosure.

FIG. 4 is a flow chart illustrating example operations that may be performed to automatically operate hazard lights in accordance with one embodiment of the present disclosure. At operation 400, the speed of a vehicle is determined. In some embodiments, the speed of a vehicle can be derived or calculated from data gathered by one or more sensors. For example one or more sensors may determine the number of rotations of a wheel. From the number of wheel rotations over some time period and the size, e.g., circumference of the wheel, the distance traveled over that period of time can be determined. Because speed is a function of distance and time, speed of the vehicle can be derived. In some embodiments, a sensor, such as a GPS or other location-based sensor can determine the distance traveled by a vehicle over some time period. Again, given the distance traveled and the time taken to travel that distance, speed of the vehicle can be determined. Still other methods/mechanisms discussed above or known to those of ordinary skill in the art may be used to determine the vehicle's speed.

At operation 402 at least one of engine output, motor output, roadway speed limit, and speed of neighboring vehicles is determined. These operating conditions or characteristics can be determined to provide a point of comparison with the speed of the vehicle. As discussed above, the speed of the vehicle relative to one or more of these operating conditions or characteristics can be used to determine whether or not the vehicle is towing a load. In some circumstances, this method of determining the presence of a towed load is preferable to other methods that use hitch mount sensors or similar mechanisms because no additional hardware/software elements are needed. For example, older, less sophisticated vehicles and/or trailers may take advantage of this method of determining the presence of a load. In some circumstances, this method can be used to confirm or provide redundancy to more sophisticated, e.g., sensor-based, tow load detection systems and methods. For example, a sensor-based, tow load detection system or method can fail. In this case, comparing vehicle speed to engine output (e.g., engine RPM) can provide another way of determining the presence of a load, upon which a determination to automatically operate the hazard lights can be based.

At operation 404, a comparison is made between the speed of the vehicle and an expected speed of the vehicle based on the at least one of the engine output, motor output, roadway speed limit, and speed of neighboring vehicles (e.g., speed of traffic). As previously discussed, engine/motor output can be correlated to an expected vehicle speed. Accordingly, the speed of the vehicle can be compared with the expected speed of the vehicle given its operating conditions/characteristics to determine whether or not it is towing load. Speed of the vehicle can also be compared with a current roadway speed limit and/or the speed of traffic to determine whether or not it is towing a load. In some embodiments, multiple comparisons can be made to provide redundancy and/or provide a way to verify another method's determination.

At operation 406, the hazard lights of the vehicle are automatically operated based on the speed of the vehicle relative to the expected speed of the vehicle and the at least one of the roadway speed limit, and the speed of the neighboring vehicles. That is, in addition to using roadway speed limit and speed of traffic to determine whether or not the vehicle is towing a load, roadway speed limit and speed of traffic can also be used to determine whether or not the vehicle is traveling slowly enough that hazard lights are warranted. In some embodiments the speed of the vehicle can be compared to a threshold speed differential to determine whether or not activating/deactivating the hazard lights of the vehicle is warranted. In some embodiments, the speed of the vehicle compared to an absolute speed threshold can provide the basis for whether or not the hazard lights of the vehicle are activated/deactivated. Those of ordinary skill in the art will understand there are a variety of ways to set and/or use speed of the vehicle as a basis for determining whether to activate or deactivate a vehicle's hazard lights.

It should be understood that various embodiments described in the present disclosure can be applied in the context of vehicles that have added weight, e.g., vehicles that are carrying some load, but not necessarily towing the load. For example, a pickup truck or camper may have heavy cargo. As a result, it may also be traveling more slowly than usual. In such a scenario, the loaded vehicle may benefit from automated hazard lights for the same/similar reasons as discussed above. Sensing the existence of a load can be achieved by comparing "empty" vehicle mass which may be known upon manufacturing and loaded mass which may be determined through sensors, engine speed (as described above), etc.

In still other embodiments, automated hazard light activation can be used for scenarios where a vehicle is not necessarily towing or carrying a load (although it still might), but is simply experiencing poor or limited performance. For example, reduced performance, e.g., high engine speed, but less-than-expected vehicle speed, may suggest a flat tire, some issues with the transmission, etc. One or more sensors can be used, or measurements regarding operating characteristics that could potentially be impacted by some issue/poor operating performance to determine the existence of such an issue. In response, hazard lights may be automatically be enabled in response to such a scenario.

Figure 5:
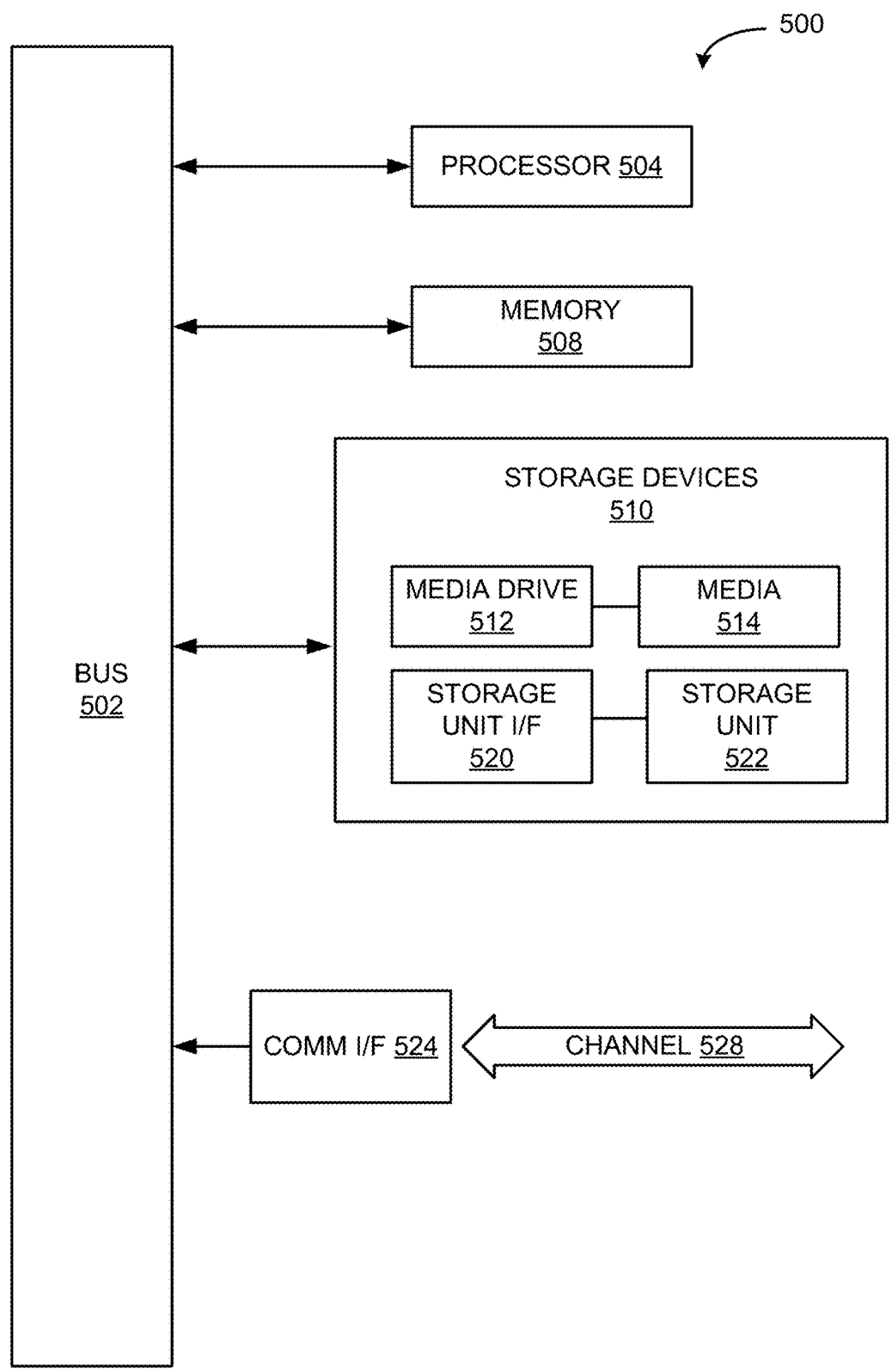
FIG. 5. illustrates an example computing system that may be used in implementing various features of embodiments of the disclosed technology.

As used herein, a circuit (or component) might be implemented utilizing any form of hardware, software, or a combination thereof. For example, one or more processors, controllers, ASICs, PLAs, PALs, CPLDs, FPGAs, logical elements, software routines or other mechanisms might be implemented to make up a circuit. In implementation, the various circuits described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where circuits are implemented in whole or in part using software, in one embodiment, these software elements can be implemented to operate with a computing or processing system capable of carrying out the functionality described with respect thereto. One such example computing system is shown in FIG. 5. Various embodiments are described in terms of this example-computing system 500. After reading this description, it will become apparent to a person skilled in the relevant art how to implement the technology using other computing systems or architectures.

Referring now to FIG. 5, computing system 500 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing system 500 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 500 might include, for example, one or more processors, controllers, control modules, or other processing devices, such as a processor 504. Processor 504 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 504 is connected to a bus 502, although any communication medium can be used to facilitate interaction with other components of computing system 500 or to communicate externally.

Computing system 500 might also include one or more memory modules, simply referred to herein as main memory 508. For example, in some embodiments random access memory (RAM) or other dynamic memory, might be used for storing information and instructions to be executed by processor 504. Main memory 508 might also be used for storing temporary variables or other intermediate information during execution of instructions to be executed by processor 504. Computing system 500 might likewise include a read only memory ("ROM") or other static storage device coupled to bus 502 for storing static information and instructions for processor 504.

The computing system 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), a flash drive, or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing system 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a flash drive and associated slot (for example, a USB drive), a PCMCIA slot and card, and other fixed or removable storage units 522 and interfaces 520 that allow software and data to be transferred from the storage unit 522 to computing system 500.

Computing system 500 might also include a communications interface 524. Communications interface 524 might be used to allow software and data to be transferred between computing system 500 and external devices. Examples of communications interface 524 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 500 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising: determining whether a vehicle is towing a load;
   determining whether the vehicle is traveling above a speed threshold, upon a determination that the vehicle is towing the load;
   upon a determination that hazard lights of the vehicle are activated, and a determination that the vehicle is not traveling above the speed threshold, maintaining activation of the hazard lights;
   upon a determination that the hazard lights of the vehicle are not activated, and a determination that the vehicle is not traveling above the speed threshold, activating the hazard lights;
   upon a determination that the hazard lights of the vehicle are not activated, and a determination that the vehicle is traveling above the speed threshold, maintaining the hazard lights in a deactivated state; and
   upon a determination that the hazard lights of the vehicle are activated, and a determination that the vehicle is traveling above the speed threshold, deactivating the hazard lights.

2. The computer-implemented method of claim 1, wherein the speed threshold comprises an absolute speed value.

3. The computer-implemented method of claim 1, wherein the speed threshold comprises a relative speed differential between a speed at which the vehicle is traveling and speed of neighboring traffic or a current speed limit of a roadway on which the vehicle is traveling.

4. The computer-implemented method of claim 1, wherein the determining of whether the vehicle is towing a load comprises determining whether a speed at which the vehicle is traveling is lower than an expected speed of the vehicle given the vehicle's engine or motor output.

5. The computer-implemented method of claim 4, wherein data regarding one or more roadway conditions are used as a basis for adjusting the expected speed of the vehicle.

6. The computer-implemented method of claim 5, wherein the data regarding the one or more roadway conditions are received in real- or near real-time, and wherein the adjusting of the expected speed of the vehicle is adjusted in real- or near-real time.

7. The computer-implemented method of claim 6, wherein the data regarding the one or more roadway conditions are received via at least one of vehicle-to-vehicle and vehicle-to-infrastructure communications.

8. A system, comprising:
   one or more sensors configured to determine one or more operating characteristics of the vehicle, wherein the one or more operating characteristics of the vehicle include at least a speed of the vehicle and an engine or motor output of the vehicle;
   a decision circuit communicatively connected to the one or more sensors via a data interface, the decision circuit configured to:
   determine an expected speed of the vehicle, the expected speed of the vehicle being correlated to the engine or motor output;
   compare the speed of the vehicle to the expected speed of the vehicle to determine whether a load is being towed or carried by the vehicle; and
   upon determining that a load is being towed or carried by the vehicle, determine if the speed of the vehicle falls below a threshold warranting activation or maintaining activation of the vehicle's turn signals in hazard mode.

9. The system of claim 8, further comprising a manually-activated hazard light switch, wherein the decision circuit transmits a control signal overriding the manually-activated hazard light switch upon a determination that activation of the vehicle's turn signals in hazard mode is warranted.

10. The system of claim 8, wherein the decision circuit accesses a table in which the expected speed of the vehicle is correlated to the engine or motor output at a local or remote data store.

11. The system of claim 10, wherein the table is updated in real- or near real-time to reflect the expected speed of the vehicle contingent upon current roadway conditions.

12. The method of claim 8, wherein the threshold comprises a determined percentage of a current roadway speed limit or a current speed at which traffic is flowing.

13. A computer-implemented method, comprising: determining a speed at which a vehicle is traveling;
    determining at least one of engine output of the vehicle, motor output of the vehicle, a current roadway speed limit, and a speed of neighboring vehicles;
    comparing the speed at which the vehicle is traveling to an expected speed of the vehicle based on the at least one of the engine output of the vehicle, motor output of the vehicle, the current roadway speed limit, and the speed of neighboring vehicles; and
    upon a determination that the speed of the vehicle relative to the expected speed of the vehicle indicates that the vehicle is towing a load, automatically operating hazard lights of the vehicle based on the speed of the vehicle relative to the expected speed of the vehicle and the at least one of the current roadway speed limit and the speed of neighboring vehicles.

14. The computer-implemented method of claim 13, wherein automatically operating the hazard lights comprises activating the hazard lights upon the determination that the speed of the vehicle relative to the expected speed of the vehicle indicates that the vehicle is towing a load.

15. The computer-implemented method of claim 14, wherein automatically operating the hazard lights further comprises activating the hazard lights upon a further determination that the speed of the vehicle relative to the at least one of the current roadway speed and the speed of the neighboring vehicles falls below a threshold warranting the activating of the hazard lights.

\* \* \* \* \*